April 27, 1954  R. G. NOBLE  2,676,720
MATERIAL HANDLING EQUIPMENT COOPERABLE WITH VEHICLES
Filed Nov. 21, 1951  3 Sheets-Sheet 1
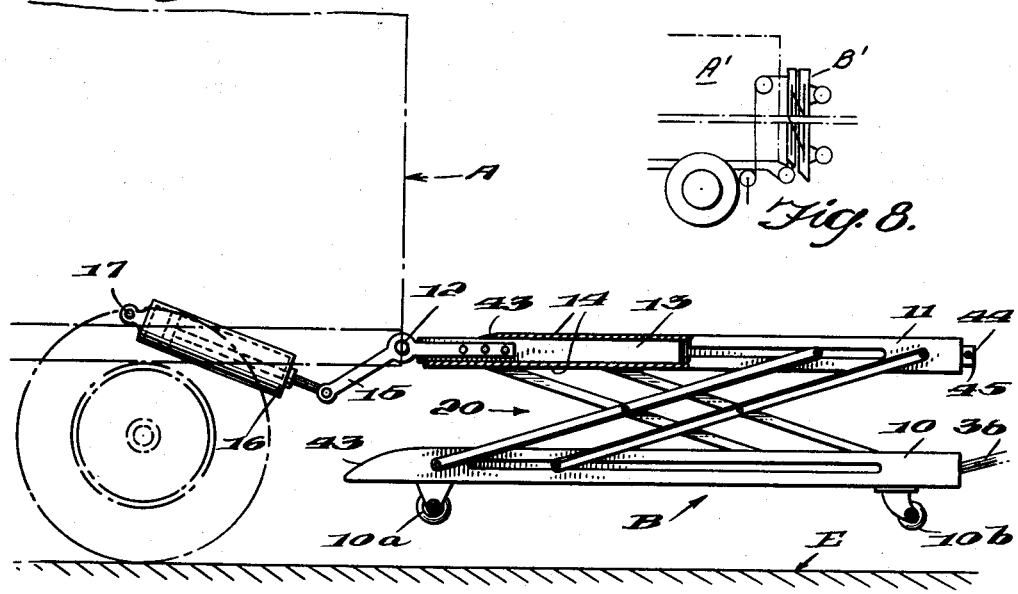
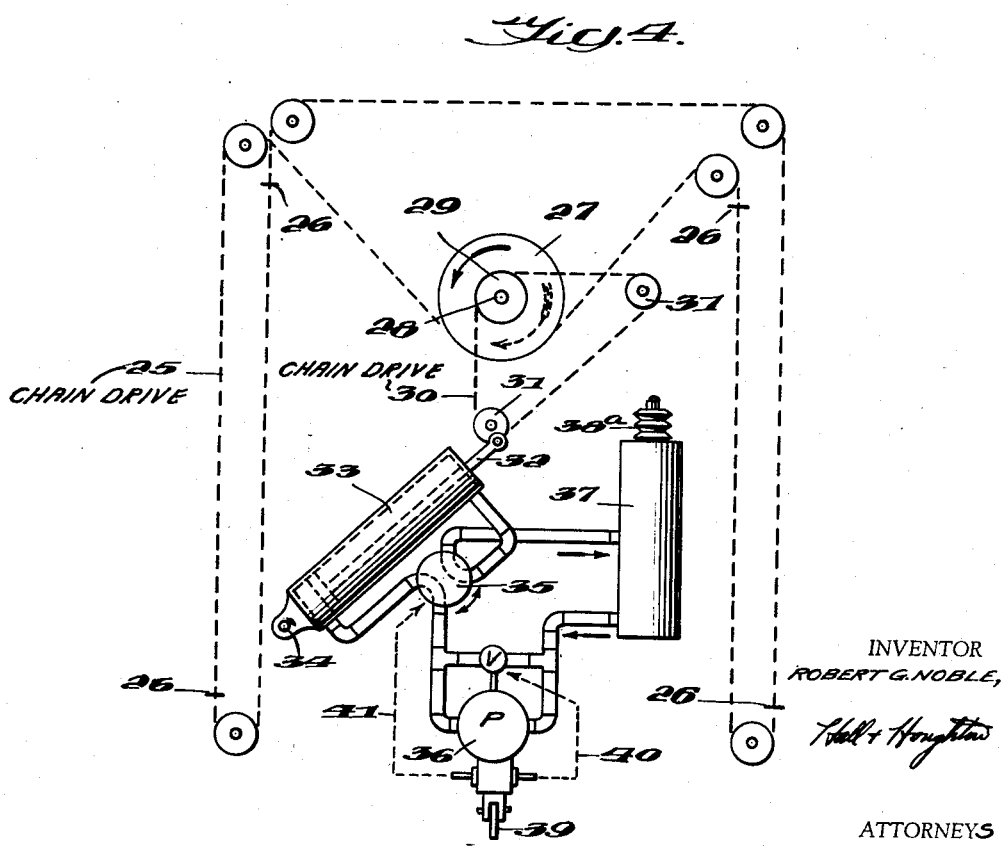
INVENTOR
ROBERT G. NOBLE,
ATTORNEYS

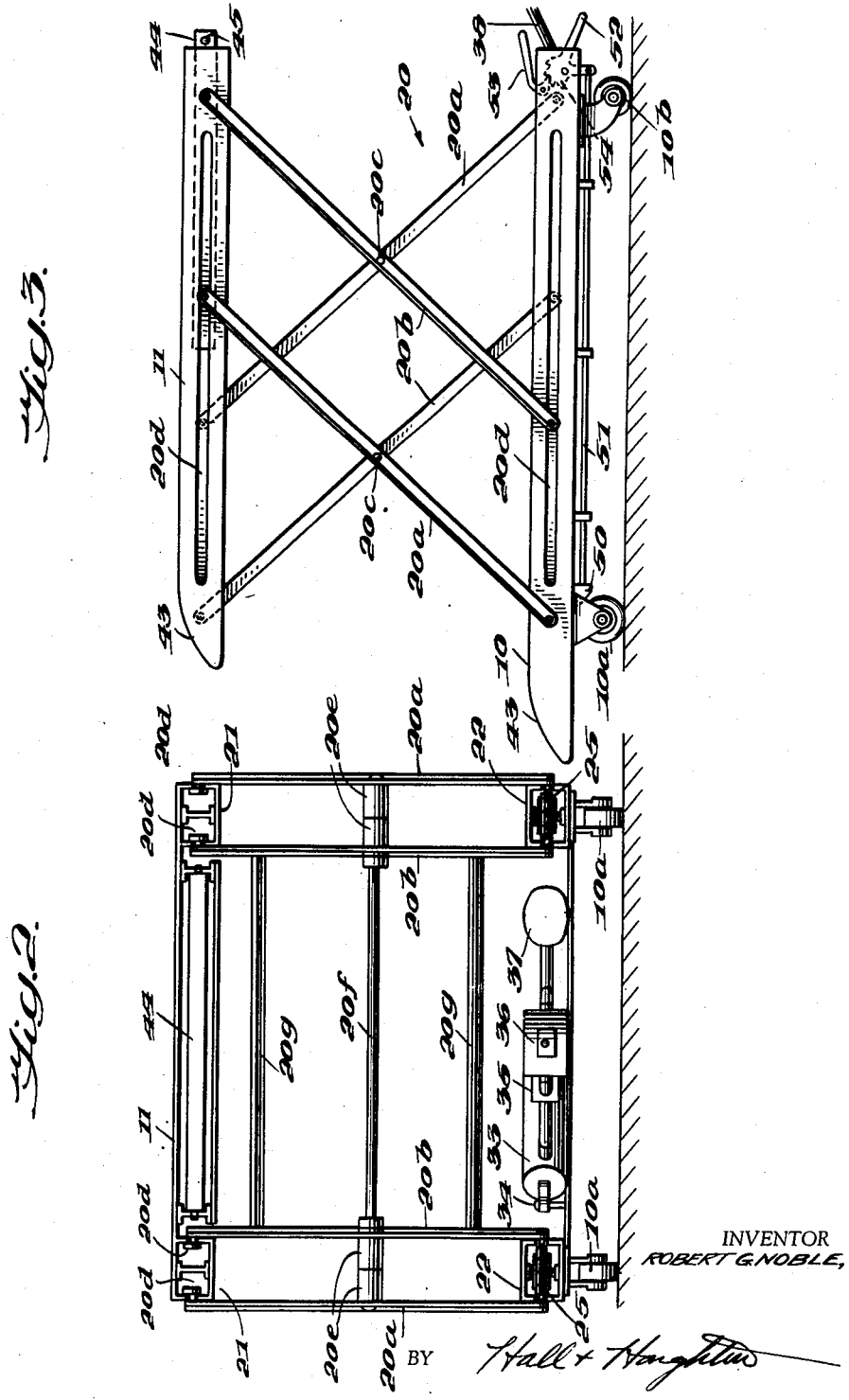

April 27, 1954 R. G. NOBLE 2,676,720
MATERIAL HANDLING EQUIPMENT COOPERABLE WITH VEHICLES
Filed Nov. 21, 1951 3 Sheets-Sheet 3
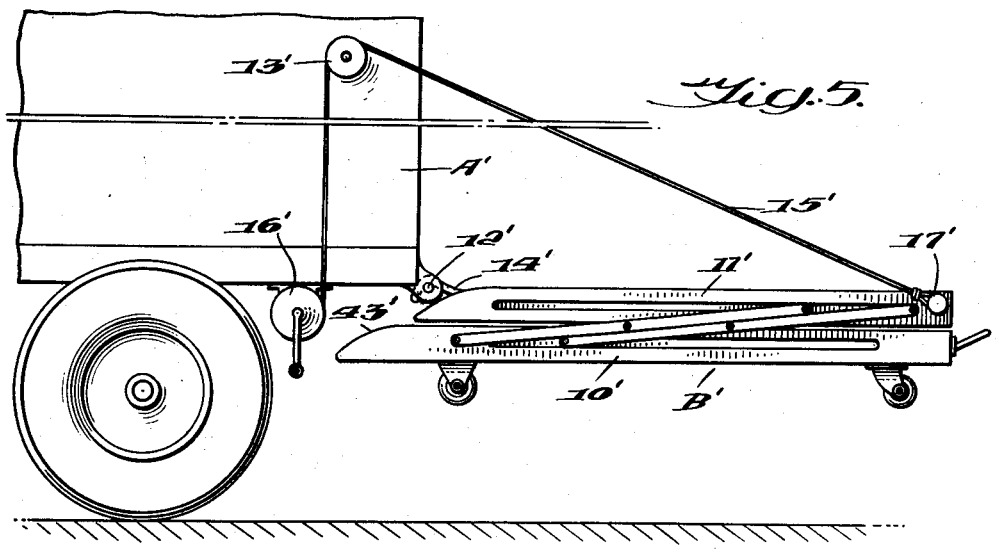
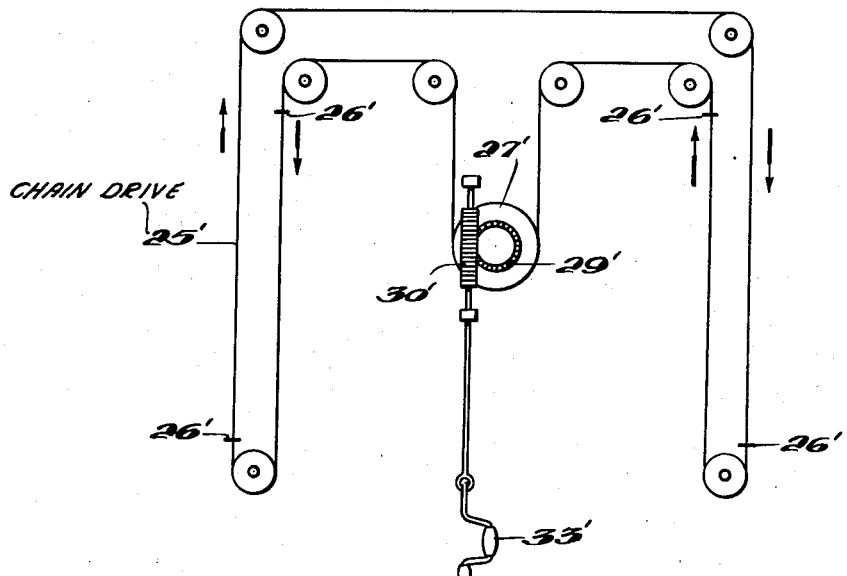
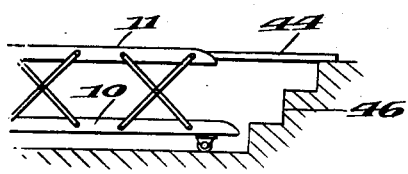
INVENTOR
ROBERT G. NOBLE,
BY *Hall + Houghton*
ATTORNEYS Patented Apr. 27, 1954

2,676,720

UNITED STATES PATENT OFFICE 2,676,720

MATERIAL HANDLING EQUIPMENT COOPERABLE WITH VEHICLES

Robert G. Noble, Burbank, Calif.

Application November 21, 1951, Serial No. 257,473

19 Claims. (Cl. 214—515)

This invention relates to material handling equipment and aims generally to improve the same.

Particular objects of the invention severally and interdependently are to provide a road vehicle having combined therewith detachable lift truck means for facilitating loading and unloading of the vehicle and pick up and delivery of load items from and to locations not directly accessible to the road vehicle; to provide in combination with a road vehicle a detachable lift truck and means for attaching the platform of the same, when elevated, to the rear of the vehicle, and means for then raising the base and platform of the lift truck into a compact assembly with the road vehicle for road transportation therewith; to provide in combination with a tail-gated road vehicle a lift truck adapted for assembly with the tail gate and means for swinging the assembled tail gate and lift truck into vertical and horizontal positions at the rear of the vehicle; to provide a compact arrangement of lift truck affording maximum lift with simple and efficient mechanism; to provide a lift truck adapted to form a loading gate extension for a road vehicle; to provide a lift truck the platform of which comprises a slidably mounted gang plank housable in the platform of the lift truck and extensible therefrom; to provide improved means housable substantially entirely in the base of the lift truck for effecting raising and lowering of the platform thereof in a simple and efficient manner; and to provide novel features and sub-combinations contributing to the foregoing general objects.

The invention resides in the novel features, sub-combinations, and combinations of elements herein described and claimed.

In the accompanying more or less diagrammatic drawings of exemplary embodiments of the invention Fig. 1 is a side elevation partly cut away showing one manner of associating the detachable lift truck with a road vehicle.

Figs. 2 and 3 are end and side elevations, respectively, of one form of the lift truck.

Fig. 4 illustrates in plan a preferred form of lifting and lowering means for the lift truck.

Fig. 5 is a side elevation of an alternative embodiment.

Fig. 6 illustrates in plan an alternative form of lifting and lowering means for the lift truck.

Fig. 7 is a side elevational diagram illustrating one mode of use of the extensible gang plank.

Fig. 8 is a side elevational diagram of the arrangement of Fig. 5 with the tail gate and lift-truck raised.

As shown in Figs. 1 to 4, in accordance with the present invention a road vehicle A, which may be a motor truck, van, or the like, is provided with a detachable lift truck B. The lift truck B comprises a base 10 which may be provided with fixed and caster wheels 10a and 10b, and a platform 11 raisable and lowerable relative to the base 10.

Means is provided for attaching the platform of the lift truck to the road vehicle A while the platform 11 is elevated relative to the base 10, and means is provided for thereafter raising the base 10 of the lift truck to the so attached platform 11 to mount the detachable lift truck B on the vehicle A out of contact with the road.

As is best shown in Fig. 1, in a preferred form the means for attaching the lift truck platform 11 to the vehicle A comprises an elevated support 12, 13, adjacent a loading door of, and preferably at the rear of the vehicle A, and support engaging means 14 carried by the platform of the lift truck B. The elevated support in the embodiment of Fig. 1 comprises a tail gate hinge 12 and a tail gate 13 of any desired or conventional construction, and the support engaging means in this embodiment comprises a formation of the lift truck platform 11 adapted to slidingly engage the tail gate, as by embracing it between upper and lower walls 14. As above noted, while the tail gate is preferably located at the rear of the vehicle A, with the sacrifice of some advantage it may be located at any loading door or station laterally of the load carrying space of the road vehicle.

As is also shown in Fig. 1 the combination in this embodiment further comprises means for tilting the so engaged lift truck B about the elevated support 12 of the vehicle A to position the platform 11 substantially vertically against the rear or other vertical wall of the vehicle A. This means in the form shown comprises bell crank arms 15 and hydraulic cylinder or fluid pressure motor means 16 suitably mounted on the vehicle A as by a pivot pin at 17 and having a suitable source of fluid pressure and suitable control valves (not shown) that may be of any desired or conventional form. With this arrangement, on operating the hydraulic cylinder in one direction the loading gate 13 and hence the hand truck B attached thereto by the engaging means 14, are tilted upwardly to a vertical position against the rear or body wall of the road vehicle A, while on operation of the cylinder or motor 16 in the opposite direction the loading gate 13, and hence the lift truck B attached thereto are lowered to the generally horizontal position shown.

As is further shown in Fig. 1 the lift truck mechanism 20 in this embodiment is arranged to produce positive relative movement between the base 10 and platform 11 of the lift truck, so that not only can it lift and lower the platform 11 with respect to the base 10 when the lift truck B is detached from the vehicle A, but so that it can also raise the base 10 of the lift truck B up to the platform 11 thereof during the mounting of the lift truck on the vehicle A, and lower the base 10 with respect to the platform 11 to drop the base to the ground E when it is desired to unload the vehicle A or to detach the lift truck B for use apart therefrom.

This positive expanding and contracting means 20 as is best shown in Figs. 2, 3 and 4 in the instant embodiment comprises a plurality of lazy tong crossed levers, or X-assemblies, 20a, 20b. In the form shown four such X-assemblies are employed, two being located at each side of the lift truck. Each of these X-assemblies comprises crossed members 20a and 20b pivoted together at their crossing points 20c, the first member of each pair being pivoted at one end to the base 10 adjacent a corner thereof with its other end having a running attachment to the platform 11, and the second member of each pair being pivoted at one end to the platform 11 adjacent the corresponding corner of the lift truck with its other end having a running attachment to the base 10. In the form shown the running attachments are affected by sliding pintles or rollers extending through slots at 20d in the base and platform members as best shown at the upper part of Figs. 2 and 3.

As is also best shown in Fig. 2 the respective members 20a and 20b are preferably formed of angle or channel iron for stiffness, with the flanges thereof directed away from each other. The members of respective pairs preferably have their sliding ends laterally spaced from and crossing one another in the lowered position of the platform as indicated in Figs. 1, 3 and 5, and slidable past each other during the lifting of the platform thereby affording a lift factor nearly equal to the full length of the platform with simple X-assembly members.

As is best shown in Fig. 2 the lateral spacing just mentioned is preferably affected by providing the base and platform with box channel sides as shown at 21 and 22 having the runways or slots at 20d arranged on opposite faces thereof. The members 20a and 20b may also be provided with elongated hubs 20e at their crossing points 20c, which hubs are engaged on common shafts 20f, this arrangement producing a simple but strong and rigid construction that may be further strengthened if desired by the use of cross members or channels 20g, extending between the inner members 20a, and 20b of oppositely positioned X-assembly elements. With this arrangement the ends of the members 20b at one side of the lift truck are spaced laterally from each other by the width of the box frames 21, 22, those members engaging in the runways thus passing each other freely during the expanding and contracting operation.

In Figs. 2 and 4 there is shown a preferred embodiment of mechanism for moving the slidably mounted ends of the X-assembly members relative to the base and platform. As shown, this mechanism is completely housed within the base 10 of the lift truck out of contact with the platform when the latter is lowered. In the illustrated form this mechanism comprises chain and sprocket means 25 having two runs extending in each of the box channels 22 at the sides of the truck base 10, which runs carry connecting members 26 secured respectively to the slidably mounted lower ends of the tong legs 20b (Fig. 3). The chain and sprocket drive 25 as shown in Fig. 4 is preferably continuous across one end of the base and in this portion of one of its runs engages a driving sprocket 27 mounted on a vertical stub shaft 28 that carries a smaller sprocket 29. A driving chain 30 extends around the smaller sprocket 29 and around idler sprocket means 31 preferably arranged to position diagonally of the truck base a run of the driving chain 30 bearing the same ratio to the length of run of the connections 26 as that of gearing 27, 29. To the so-positioned run of driving chain 30 is attached the driving member 32 of a hydraulic cylinder or fluid pressure motor 33 which is suitably supported in alignment therewith as by a vertical pin 34.

By the diagonal arrangement of the cylinder 33 and the chain run between the sprockets 31, a maximum travel is afforded the piston 32 of the cylinder 33 without any extension thereof beyond the lift truck frame. Hence this arrangement allows greater power to be attained with a cylinder 33 of relatively small diameter adapted to be housed entirely within the height of the base 10.

The hydraulic platform elevating and lowering system in the form shown, comprises the double acting cylinder 33 in circuit with a reversing valve 35, a one way manually operated hydraulic jack type pump 36, and a reservoir 37, all located so as not to interfere with lowering of the platform 11 to the maximum extent. The hydraulic pump 36 is provided with the usual handle 38 (Figs. 1 and 3) preferably detachable as by a bayonet connection 39 (Fig. 4), vertical motion of which operates the pump, and at one extreme thereof operates the pump relief valve V as indicated at 40, and rotation of which controls the position of the reversing valve 35 as indicated at 41. The system may be totally closed, in which case it is provided with an expansion bellows conveniently located on the reservoir 37 as indicated at 38a.

With this arrangement when it is desired to lower the lift truck base to dismount the truck B from the vehicle A, the relief valve V may be opened to allow dropping of the truck base 10 to ground level under its own weight, or with the valve 35 properly positioned, the base B may be lowered by controlled pumping action. When the hand truck is detached from the vehicle the platform may be raised and lowered throughout a wide range of heights by this mechanism. If desired the upper and lower platforms may be provided with ramping means, as exemplified at 43 and by the gang plank hereinafter described, to facilitate loading and unloading of materials from ground level.

In the preferred embodiment as best illustrated in Figs. 2 and 3 the lift truck, and preferably the upper platform 11 thereof is arranged to also house a gang plank 44 which preferably enters between structural elements of the platform 11 and is prevented from passing therethrough by suitable stop means 45. As illustrated in Fig. 7 the inclusion of such gang plank means provides a ramp and also enables pick up and delivery of articles directly between the elevated platform 11 and elevated locations that cannot be directly reached by the lift truck, for example because of the presence of steps 46, that can be bridged by the gang plank 44.

The invention of course in its broader aspects is not limited to the form just described, but may be embodied in other forms, one of which is illustrated in Figs. 5 and 6. In this embodiment the road vehicle A' may be of the type having no tail gate and having loading doors completely closing the entire rear wall of the cargo space. In this form the elevated support 12' comprises one or more hinge pins or shafts secured at the rear of the vehicle A', and the lift truck platform 11' is again provided with means for attaching it to the vehicle while the platform is elevated, such means being in the form of hook shaped members 14' adapted to engage the elevated supporting means 12'. In this embodiment the means for tilting the lift truck about the elevated support 12' to position its platform substantially vertically against the rear of the road vehicle comprises cable elements 15' passing over an elevated sheave 13' and wound on a drum 16'. The drum 16' may be provided with the usual holding dogs (not shown) and may be manually or power driven. Means shown as headed lugs 17' may be provided for attaching the free ends of the cables 15' to the lift truck in spaced relation to the elevated support 12'.

In lieu of the driving arrangement shown in Fig. 4 other arrangements may be employed as exemplified in Fig. 6 in which the chain run 25' is generally similar to that in Fig. 4, but in which the driving sprocket 27' is manually operated by a worm and wheel drive 29', 30', 33', the irreversibility of which retains the platform at its adjusted level.

Various auxiliary devices may of course be provided for the hand truck as for example removable sides or stakes for the elevated platform and the like. The device may be provided with suitable brake means one form of which is exemplified in Fig. 3 in which brake shoes 50 associated with the stationary or rear wheels 10a are operated by push rod means 51 from a foot treadle 52 at the forward or pulling end of the truck; suitable dog and ratchet means 53, 54 releasable from the said end of the truck, being provided for retaining the brake means in engagement until its release is desired.

The peculiar utility of the invention may readily be appreciated from a single example of its use. Assume that one man with a road vehicle is assigned to pick up a 1000 pound crate that is located at an elevation three feet above ground level, that the vehicle can approach no closer than twenty feet from the crate, and that after the pick-up the driver must make delivery to another location with the above conditions reversed.

With the present invention the driver, unassisted, can handle the entire job swiftly, safely and with very little effort. Arriving at the pick-up location he lowers the tail mounted hand truck to a horizontal position at the level of the truck floor. He then lowers the under carriage or base 10 of the lift truck to ground level, attaches the pull handle, pulls the lift truck clear of the vehicle attachment, lowers the lift truck platform to its lowest level, and pulls or wheels the lift truck to the crate site or elevation. He then raises the lift platform to the level of the crate and locks the brake means 50. After moving the crate onto the platform, with or without using the gang plank, depending on the circumstances, the operator again lowers the platform to lowest level; pulls the hand truck back to the vehicle; raises the platform and attaches it to the vehicle either by fitting it on the tail gate or otherwise attaching it to the elevated support, and moves the crate from the lift truck platform to the truck floor. He then raises the lift truck undercarriage to the position shown in Fig. 5 and swings the now supported assembly upward to a vertical position (see Fig. 8) by means of the tilting mechanism 15, 16, or 15', 16' and is ready to drive to the delivery location. On arrival at the latter point he merely reverses the above procedure to complete the job.

With appropriate construction the elevation of the platform in lowered position may be made as low as six inches above ground level contributing greatly to the safety of moving heavy and unstable articles. By the use of the gang plank or a similar ramp element, as well as by sloping off one end of the platform as at 43, loading and unloading with respect to ground level or elevated levels, is facilitated. In the preferred construction the lift truck platform is supported at all four corners at all times, and the arrangement may be used for picking up material from or delivering it to various bin levels to a height of as much as twelve feet (with an operator standing on the lift truck) while maintaining the overall length of the lift truck less than the normal height of a van body.

If the lift truck element has a width capable of fitting between the wheels of the vehicle it may be used on occasion for jacking up the vehicle for tire changing and other repairs. When the vehicle is not in use the lift truck element being detachable may be used about the plant or warehouse for general utility purposes.

While there have been described herein what are at present considered preferred embodiments of the invention it will be obvious from the foregoing description that various modifications and changes may be made therein within the broader aspects of the invention. It is therefore to be understood that the exemplary embodiments are illustrative and not restrictive of the invention, the scope of which is defined in the appended claims, and that all modifications that come within the meaning and range of equivalency of the claims are intended to be included therein.

I claim:

1. The combination with a road vehicle having a load carrying space of a detachable lift truck, the truck comprising a base and a platform raisable and lowerable relative to the base, means for attaching the platform of the truck to the vehicle laterally of said space while the platform is elevated relative to the base, and means for raising the base to the so attached platform to mount the detachable truck on the vehicle out of contact with the road and outside the limits of the load carrying space of the vehicle.

2. A combination according to claim 1 in which the means for attaching the lift truck platform to the vehicle comprises an elevated support at the rear of the load carrying space of the vehicle and support engaging means carried by the platform of said lift truck.

3. A combination according to claim 2 further comprising means for uptilting said lift truck about said elevated support to swing its platform to a position lying substantially vertically at the rear of said road vehicle.

4. A combination according to claim 3 in which said last named means comprises drum and cable means carried by said road vehicle, and means for releasably attaching the cable means to the lift truck in longitudinally spaced relation to said support engaging means.

5. A combination according to claim 3 in which said last named means comprises fluid pressure means for uptilting said lift truck about said elevated support to position its platform substantially vertically against the rear of said road vehicle, or to extend it substantially horizontally therefrom.

6. A combination according to claim 1 in which the means for attaching the elevated truck platform to the vehicle comprises a tail gate hinged to the vehicle and a formation of the lift truck platform adapted to slidably engage said tail gate, and in which said tail gate is movable to a vertical position to swing the lift truck platform into a vertical position at the rear of the road vehicle.

7. A combination according to claim 6 further comprising hydraulic means for raising and lowering said tail gate to substantially vertical and substantially horizontal positions respectively.

8. A combination according to claim 1 in which said last named means comprises four X-assemblies each consisting of a single crossed pair of rigid members pivoted together at their crossing points, the first member of each pair being pivoted at one end to the base adjacent a corner thereof with its other end slidably attached to the platform, the second member of each pair being pivoted at one end to the platform adjacent the corresponding corner thereof and having its other end slidably attached to said base, whereby on movement of said X-assemblies to platform elevating position a substantially vertical and rigid support is afforded adjacent each corner of the platform, and means for sliding the said other ends of said four X-assemblies relative to said base and platform for lifting and lowering the four corners of said platform relative to said base.

9. A combination according to claim 8 in which said X-assemblies are mounted in pairs at opposite sides of the platform with their sliding ends laterally spaced from and crossing one another in the lowered position of the platform and slidable past each other during the lifting of the platform thereby affording a lift factor nearly equal to the full length of the platform.

10. A combination according to claim 8 further comprising chain and sprocket means for simultaneously sliding said other ends of said X-assembly members relative to said base and platform, and reversible means for driving said chain and sprocket means.

11. A combination according to claim 10 in which said reversible means comprises a hydraulic system coupled to said chain and sprocket means and completely housed within the base of said lift truck out of contact with the platform thereof when the latter is lowered.

12. A combination according to claim 10 in which said reversible means comprises a gear drive coupled to said chain and sprocket means.

13. A combination according to claim 1 in which said platform comprises a slidably mounted gang-plank housable in said platform and extensible therefrom.

14. The combination with a road vehicle having an elevated support at the rear end thereof of a lift truck detachable from the vehicle for use apart therefrom, said lift truck comprising a wheeled base and an elevatable platform carried by said base, means for attaching the elevatable platform of the lift truck to the elevated support of the road vehicle while the lift truck platform is in elevated position, means for raising the base of the lift truck to the so attached platform, and means for securing the so lifted truck in position for transportation on the road vehicle; said last named means including means for uptilting the lift truck about said elevated support to swing the base and platform of the lift truck into a substantially vertical position at the rear of the road vehicle.

15. A lift truck of the type comprising a base and a platform with means for raising and lowering the platform relative to the base, said means comprising four X-assemblies each consisting of a single crossed pair of rigid members pivoted together at their crossing points, the first member of each pair being pivoted at one end to the base adjacent a corner thereof with its other end slidably related to the platform, the second member of each pair being pivoted at one end to the platform adjacent the corresponding corner thereof and having its other end slidable relative to said base, whereby on movement of said X-assemblies to platform elevating position a substantially vertical and rigid support is afforded adjacent each corner of the platform, and means for simultaneously sliding the said other ends of said four X-assemblies relative to said base and platform for simultaneously lifting and lowering the four corners of said platform relative to said base; in which said X-assemblies are mounted in pairs at opposite sides of the platform with their sliding ends laterally spaced from and crossing one another in the lowered position of the platform and slidable past each other during the lifting of the platform thereby affording a lift factor nearly equal to the full length of the platform.

16. A combination according to claim 15 further comprising chain and sprocket means for sliding said other ends of said X-assembly members past each other in said slots, and reversible means for driving said chain and sprocket means.

17. A combination according to claim 16, said chain and sprocket means and said reversible means being completely housed within the base of the lift truck and out of contact with the platform thereof when the latter is lowered, and said platform having housed therein a slidably mounted gang plank extensible therefrom.

18. A lift truck of the type comprising a base and a platform with means for raising and lowering the platform relative to the base, said means comprising four X-assemblies each consisting of a single crossed pair of rigid members pivoted together at their crossing points, the first member of each pair being pivoted at one end to the base adjacent a corner thereof with its other end slidably related to the platform, the second member of each pair being pivoted at one end to the platform adjacent the corresponding corner thereof and having its other end slidable relative to said base, whereby on movement of said X-assemblies to platform elevating position a substantially vertical and rigid support is afforded adjacent each corner of the platform, and means for simultaneously sliding the said other ends of said four X-assemblies relative to said base and platform for simultaneously lifting and lowering the four corners of said platform relative to said base; said lift truck further comprising chain and sprocket means for sliding said other ends of said X-assembly members in said slots and reversible means for driving said chain and sprocket means comprising a hydraulic system coupled to said chain and sprocket means and completely housed within the base of said lift truck out of contact with the platform thereof when the latter is lowered.

19. A combination according to claim 18 in which said platform comprises a slidably mounted gang plank housable in said platform and extensible therefrom.

References Cited in the file of this patent

UNITED STATES PATENTS

| Number | Name | Date |
|---|---|---|
| 1,602,112 | Johnson | Oct. 5, 1926 |
| 1,704,841 | Sacerdote | Mar. 12, 1929 |
| 2,080,709 | Hall et al. | May 18, 1937 |
| 2,129,340 | Webber | Sept. 6, 1938 |
| 2,132,343 | Jarrett | Oct. 4, 1938 |
| 2,480,916 | Gibson | Sept. 6, 1949 |
| 2,598,489 | Bayer et al. | May 27, 1952 |
| 2,624,535 | Bollhoefer | Jan. 6, 1953 |

FOREIGN PATENTS

| Number | Country | Date |
|---|---|---|
| 131,433 | Switzerland | Feb. 15, 1929 |
| 529,605 | Great Britain | Nov. 25, 1940 |
| 50,510 | Netherlands | May 16, 1941 |
| 433,307 | Italy | Apr. 5, 1948 |